(12) United States Patent
Palmer

(10) Patent No.: US 9,852,653 B1
(45) Date of Patent: Dec. 26, 2017

(54) TOUCH ACTIVATED EATING UTENSIL SLEEVE FOR CONTROLLING FOOD CONSUMPTION

(71) Applicant: Christopher Lott Palmer, York, PA (US)

(72) Inventor: Christopher Lott Palmer, York, PA (US)

(73) Assignee: Christopher L Palmer, York, PA (US)

( * ) Notice: Subject to any disclaimer, the term of this patent is extended or adjusted under 35 U.S.C. 154(b) by 150 days.

(21) Appl. No.: 14/739,870

(22) Filed: Jun. 15, 2015

(51) Int. Cl.
  *B25F 1/00* (2006.01)
  *G09B 19/00* (2006.01)

(52) U.S. Cl.
  CPC .................... *G09B 19/0092* (2013.01)

(58) Field of Classification Search
  None
  See application file for complete search history.

(56) References Cited

U.S. PATENT DOCUMENTS

| | | | | |
|---|---|---|---|---|
| 4,207,673 A * | 6/1980 | DiGirolamo | ............. | B25G 1/00 30/123 |
| 5,421,089 A * | 6/1995 | Dubus | .................... | A47G 21/02 30/142 |
| 9,146,147 B1 * | 9/2015 | Bakhsh | .................. | A47G 21/02 |
| 9,198,605 B2 * | 12/2015 | Contant | ................. | A47G 21/02 |
| 9,442,100 B2 * | 9/2016 | Connor | .................. | G01N 33/02 |
| 2008/0276461 A1 * | 11/2008 | Gold | ....................... | A47G 21/02 30/142 |
| 2015/0250683 A1 * | 9/2015 | Cross | ........................ | A61J 9/08 206/459.1 |

* cited by examiner

*Primary Examiner* — Sunit Pandya

(57) ABSTRACT

A diet aid comprises a removable sleeve, having a timing circuit with user-adjustable delay, visual cues, and a slot into which an ordinary eating utensil can be inserted, the insertion of the utensil energizing the circuit, with the delay cycle triggered automatically as the user places a bite of food to their mouth.

3 Claims, 6 Drawing Sheets

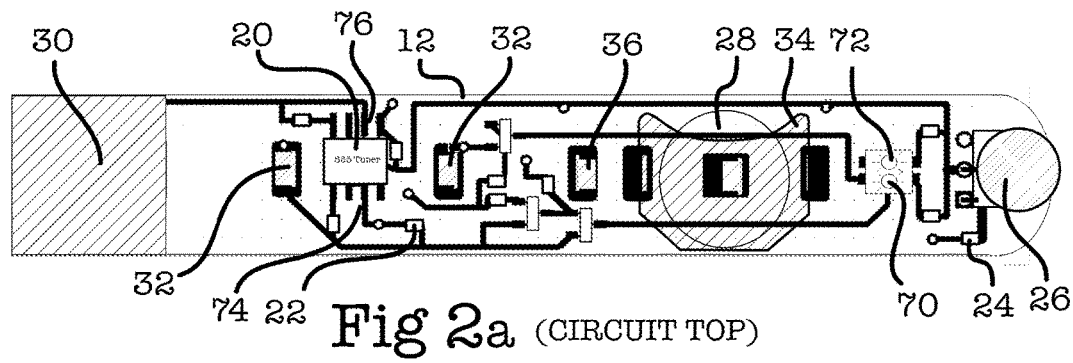
Fig 2a (CIRCUIT TOP)
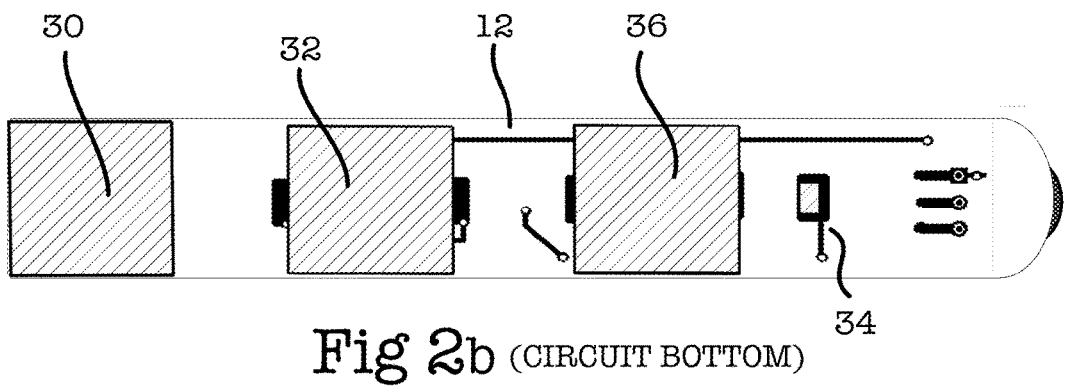
Fig 2b (CIRCUIT BOTTOM)
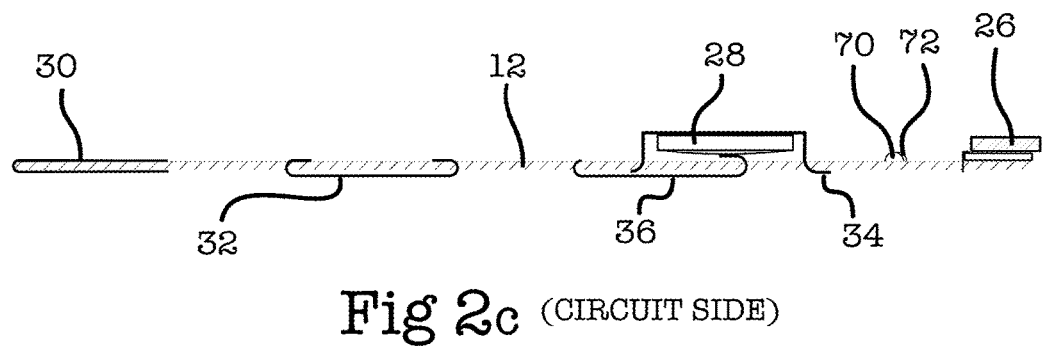
Fig 2c (CIRCUIT SIDE)

TOUCH ACTIVATED EATING UTENSIL SLEEVE FOR CONTROLLING FOOD CONSUMPTION

CROSS-REFERENCE TO RELATED APPLICATIONS

This application claims the benefit of U.S. Provisional Application Ser. No. 62/012,506 filed Jun. 16, 2014 by the present inventor.

TECHNICAL FIELD

The present invention relates to a dieting aid, and more specifically to a device used during mealtime for regulating eating by means of cues that slow down the eating process.

BACKGROUND OF THE INVENTION

Nearly two-thirds of adult Americans, and a growing percentage in many other developed countries, are overweight or obese. Despite the attention of healthcare professionals, the media and the public at large, the problem keeps getting worse. One of the major factors in the kind of unhealthy eating that can lead to weight gain is the busy lifestyles of an always-on-the-go public, in which every activity, including eating, is now rushed.

To combat weight gain and obesity, many people turn to dieting, which might involve allocating less food for a meal, buying diet-sized special meals, counting calories, taking pills, or other less than pleasurable attempts at stemming weight gain.

However, one of the most successful methods of losing weight through dieting is to control the portion of food one consumes. Although exercise and the type of foods eaten can aid with weight loss, controlling the amount of food eaten over a given period of time can have a dramatic impact on one's weight.

Scientific studies have shown that there is, on average, a 15-20 minute delay between the stomach reaching capacity and the eater feeling full. This delay in the signals of fullness reaching the brain has prompted many recommendations for dieters to slow down their eating in order to achieve a sense of satiety before more food than necessary is consumed.

Studies have shown that eating more slowly can result in multiple health benefits, including better digestion of food (less indigestion), less hormonal stress on the body, increased pleasure in the dining experience, and a decrease in caloric intake due to the brain having time to "catch up" with the stomach's sense of satiety or fullness.

The benefits of exercising portion control by eating more slowing have been known for some time, and as such, several prior art devices have been suggested for providing the user some feedback mechanism for timing the duration between bites in an attempt to delay each bite, with the goal of slowing down the overall eating process.

Past attempts to provide some sort of feedback mechanism for pausing between bites have been proposed, including sensors that measure hand movement, and utensils with built-in visual or audible indicators and predetermined delays that inform the user when to take a bite and when to refrain.

The following is a tabulation of some prior art that presently appears relevant:

U.S. patent application Publications

| Publication Number | Kind Code | Publication Date | Applicant |
|---|---|---|---|
| 4,207,673 | A | 1980 Jul. 17 | DiGirolamo, DiGirolamo |
| 4,218,611 | A | 1980 Aug. 19 | Cannon |
| 4,914,819 | A | 1990 Apr. 10 | Ash |
| 4,975,682 | A | 1990 Dec. 4 | Kerr, Rott |
| 5,421,089 | A | 1995 Jun. 6 | Dubus, Springfield |
| 20120115111 | A1 | 2005 May 10 | LePine |
| 20090253105 | A1 | 2009 Oct. 8 | LePine |
| 20100109876 | A1 | 2010 May 6 | Schmid-Schonbein, Altshuler, Gorish, Sukhija, Williams, Wu |
| 20100240962 | A1 | 2010 Sep. 23 | Contant |
| 7,855,936 | B2 | 2010 Dec. 21 | Czarnek, Aruffo |
| 20110091841 | A1 | 2011 Apr. 21 | Orlinsky, Orlinsky, Spiegel, Spiegel |

Foreign Patent Documents

| Foreign Doc. Nr. | Country Code | Kind Code | Pub. Date | Patentee |
|---|---|---|---|---|
| 2,023,780 | EP | B1 | 2009 Dec. 30 | Lepine |
| 2009105849 | WO | A2 | 2009 Sep. 3 | Kim |

While these devices meet various objectives in their attempt to get the user to slow down their eating, I have determined that several disadvantages still remain in the way heretofore known portion control devices are implemented and used, namely:

(a) Hand motion detectors can falsely trigger, as the users hand might be bringing a class of water to their mouth instead of a fork-full of food.

(b) Utensils containing visual/audible indicators triggered at pre-determined time intervals fail to take into account differing eating styles and the fact that users new to slowing down their eating may need to "ease into" longer delays.

(c) Utensils with built-in delay circuitry, when used in public environments such as restaurants, may also be difficult to store after a meal, since the soiled utensil is either a permanent fixture of the device, or a custom utensil head that only works with the device.

(d) Devices with built-in utensils also carry the additional burden and expense of being water-proof so that the utensil end can be properly cleaned.

(e) Devices that include the utensil or that contain more complex circuitry are more expensive to manufacture and may be more cost-prohibitive to the average consumer, who may just be looking for a simple tool to help them establish proper portion control.

SUMMARY OF THE INVENTION

In accordance with one embodiment a diet aid comprises a removable sleeve, having a timing circuit with user-adjustable delay, visual cues, and a slot into which an ordinary utensil can be inserted, the insertion of the utensil energizing the circuit, with the delay cycle triggered automatically as the user places a bite of food to their mouth.

Advantages

Accordingly several advantages of one or more aspects are as follows: to provide a portion control device that can fit into a pocket or purse, be removed, and slid onto a favorite fork or spoon, activating it automatically, that will sense a bite of food automatically, pause a user-adjustable period of time, that can be removed from the soiled utensil, that can be low cost and simple to use.

Objects

A sleeve made of material appropriate for gripping by the hand, possessing a slot or other opening into which any eating utensil (fork or spoon) can be inserted.

A timing circuit that is triggered by the food or utensil touching the mouth or teeth, and which counts an adjustable number of seconds before alerting the user that they may take their next bite.

An electrically conductive material placed on a section of the outside of the sleeve where it's proximity to the user's natural grip on the sleeve provides an electrical connection between the eater's hand as they hold the sleeve, and the timing circuit.

An electrically conductive material placed on the inside of the sleeve where it provides an electrical connection between the inserted utensil (metal fork or spoon) and the timing circuit.

A visual cue is provided in the form of two lights. Once the user has taken a bite (triggering the aforementioned timing circuit), a red light turns on, and remains lit for the length of the delay the user has chosen. Once the delay period has ended, the red light turns off and a green light turns on, indicating that another bite may be taken.

DESCRIPTION OF THE DRAWINGS

FIG. 2a, FIG. 2b and FIG. 2c illustrate the top, bottom and side views, respectively, of the stiff circuit board embodiment that contains the timing and visual indicator circuitry.

LIST OF REFERENCE NUMERALS

Figure 1:
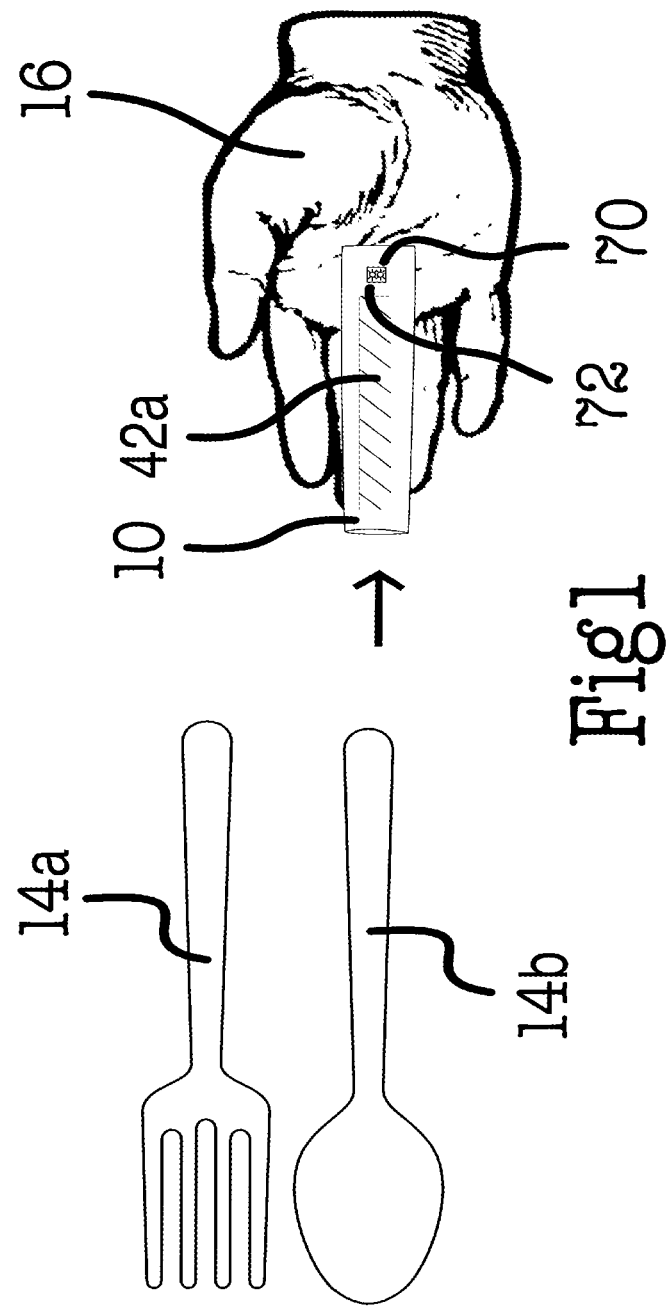
FIG. 1 is a summary view of the sleeve embodiment containing the circuit, the placement of visual indicator LEDs, and how the sleeve is used with an eating utensil.

10 Sleeve Base Material
12 Circuit Board
14a Utensil (Fork)
14b Utensil (Spoon)
16 User's Hand
20 555 Timer Chip
22 Timing Circuit Capacitor
24 Timing Circuit static resistor
26 Timing Circuit variable resistor
28 Circuit Battery
30 Timing Cycle Trigger Connector
32 Circuit Board Ground Connector
34 Circuit Board Vcc Voltage Connector
36 Battery Negative Terminal
38a Conductive material to connect Utensil to Battery Negative Terminal—Utensil Side
38b Conductive material to connect Utensil to Battery Negative Terminal—Circuit Board Side
40a Conductive material to connect Utensil to Circuit Ground—Lower Utensil Side
40b Conductive material to connect Utensil to Circuit Ground—Upper Utensil Side
40c Conductive material to connect Utensil to Circuit Ground—Circuit Board Side
42a Conductive material to connect User's Hand to Timing Cycle Trigger Connector—Hand Side
42b Conductive material to connect User's Hand to Timing Cycle Trigger Connector—Circuit Board Side
44 Conductive Thread to connect Conductive Material on one side of the Sleeve Base Material to Conductive Material on the other side of the Sleeve Base Material
50 Folds in Sleeve Base Material
54 LED Display Window
56 Opening in Sleeve where Circuit Board is Inserted
58 Opening in Sleeve where Utensil is inserted
60 Circuit Cover Flap
62 Velcro Closure
70 Green Visual Indicator LED
72 Red Visual Indicator LED
74 555 Timer Output pin
76 555 Timer Trigger Pin

DETAILED DESCRIPTION—FIRST EMBODIMENT

A sleeve 10 (FIGS. 3a, 3b, 3c), upon which are attached 7 strips 38a, 38b, 40a, 40b, 40c, 42a, 42b of electrically conductive material. I presently contemplate that the sleeve is made of a thin stretchable fabric material that can stretch to accommodate varying utensil handle sizes, but other materials are also suitable. I contemplate the sleeve being folded (FIG. 3c) at fold lines 50 (FIGS. 3a, 3b) in such a way as to create two openings, but other construction methods for creating openings are also suitable. A circuit board 12 containing timing and visual indicator circuitry is inserted into the sleeve 10 by means of opening 56 (FIG. 3c). I presently contemplate that the circuit board is stiff and unbendable, but thin flexible circuit material is also suitable. An ordinary metal utensil, either a fork 14a or spoon 14b, hereinafter referred to as utensil, is inserted into the sleeve by means of opening 58 (FIG. 3c). The user's hand 16 then holds the sleeve, which houses both the circuit board and the utensil (FIG. 4).

Figure 3A:
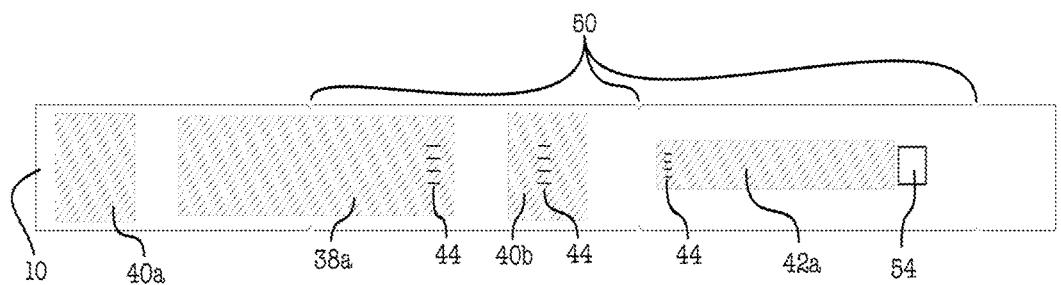
FIG. 3a and FIG. 3b illustrate top and bottom views of the fabric sleeve embodiment if the material were to be unassembled and laid flat.
Figure 3B:
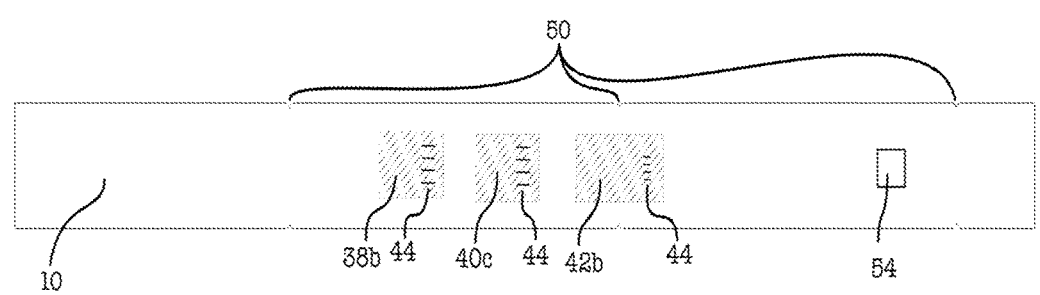
Figure 3C:
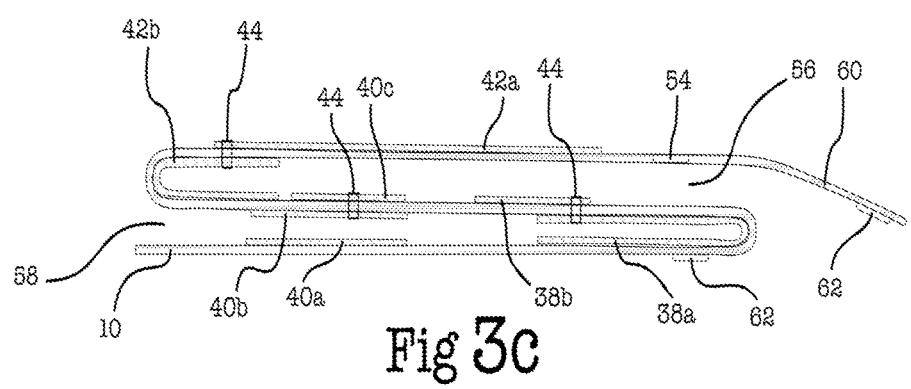
FIG. 3c illustrates an enlarged side view of one embodiment of the sleeve, showing how it could be folded prior to embroidery/assembly, and the positioning of the electrically conductive material in relation to the folds into which the circuit and utensil would be inserted.

Referring to FIGS. 3a, 3b and 3c, the electrically conductive strips 38a, 38b, 40a, 40b, 40c, 42a, 42b are positioned on sleeve 10 in such a way that essential electrical connections are made between the sleeve and circuit board (FIG. 4), between the user's hand and the sleeve, and between the sleeve and the utensil inserted into the sleeve by means of opening 58.

Figure 4:
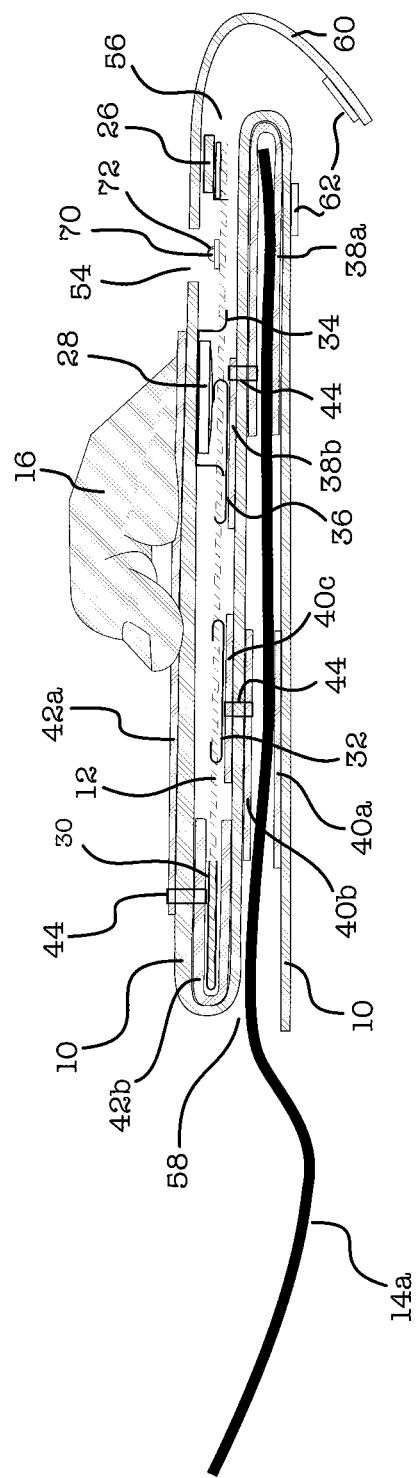
FIG. 4 illustrates a cross-sectional view of one embodiment of the invention while it is being used, including how the components might fit together and interact.

Referring to FIG. 4, conductive strip 42a is positioned on the outside of the sleeve in a location that would be touched by the hand 16 when the sleeve is held in a normal position, as one would hold a utensil when eating. It is connected electrically through the sleeve 10 to conductive strip 42b by means of electrically conductive thread 44. Conductive strip 42b is positioned to come into electrical contact with the timing cycle trigger connector 30, thereby connecting the hand 16 electrically with the timing cycle trigger connector 30.

Conductive strip 38a (FIG. 4) is positioned to come into electrical contact with the utensil, which has been inserted into the sleeve 10 by means of opening 58. Conductive strip 38a is connected electrically through the sleeve 10 to conductive strip 38b by means of electrically conductive thread 44. Conductive strip 38b is positioned to come into electrical contact with the battery negative terminal 36, thereby connecting the inserted utensil electrically to the battery negative terminal 36.

Conductive strip 40b is also positioned to come into electrical contact with the utensil. Conductive strip 40b is connected electrically through the sleeve 10 to conductive strip 40c by means of electrically conductive thread 44. Conductive strip 40c is positioned to come into electrical contact with the circuit board ground connector 32, thereby connecting the inserted utensil electrically to the circuit board ground connector 32. The utensil, being metal and a conductor of electricity, effectively acts as a switch, connecting the battery negative terminal 36 to circuit board ground connector 32, powering on the circuit as the utensil is inserted.

Conductive strip 40a simply aids conductive strip 40b in making a proper electrical connection to the inserted utensil.

A circuit (FIG. 5) affixed to a circuit board 12 (FIGS. 2a, 2b and 2c) and inserted into the sleeve 10 via opening 56 that is powered by a 3 volt cell battery 28 and which contains a ground connector 32, battery negative terminal connector 36, timing cycle trigger connector 30, 555 timer chip 20, timing circuitry and visual indicator LEDs 70 and 72. I presently contemplate that the timing circuitry is comprised of a low power 555 timer chip, timing capacitor 22, and timing resistors 24 and 26, although other timing devices and circuitry can be used. The variable resistor 26 allows the RC timing cycle of the 555 timer chip 20 to be modified from between approximately 5.5 seconds and 35 seconds. The variable resistor 26 contains a dial (FIG. 2a) which can be adjusted by the user, allowing them to determine the delay between bites.

Operation

Figure 5:
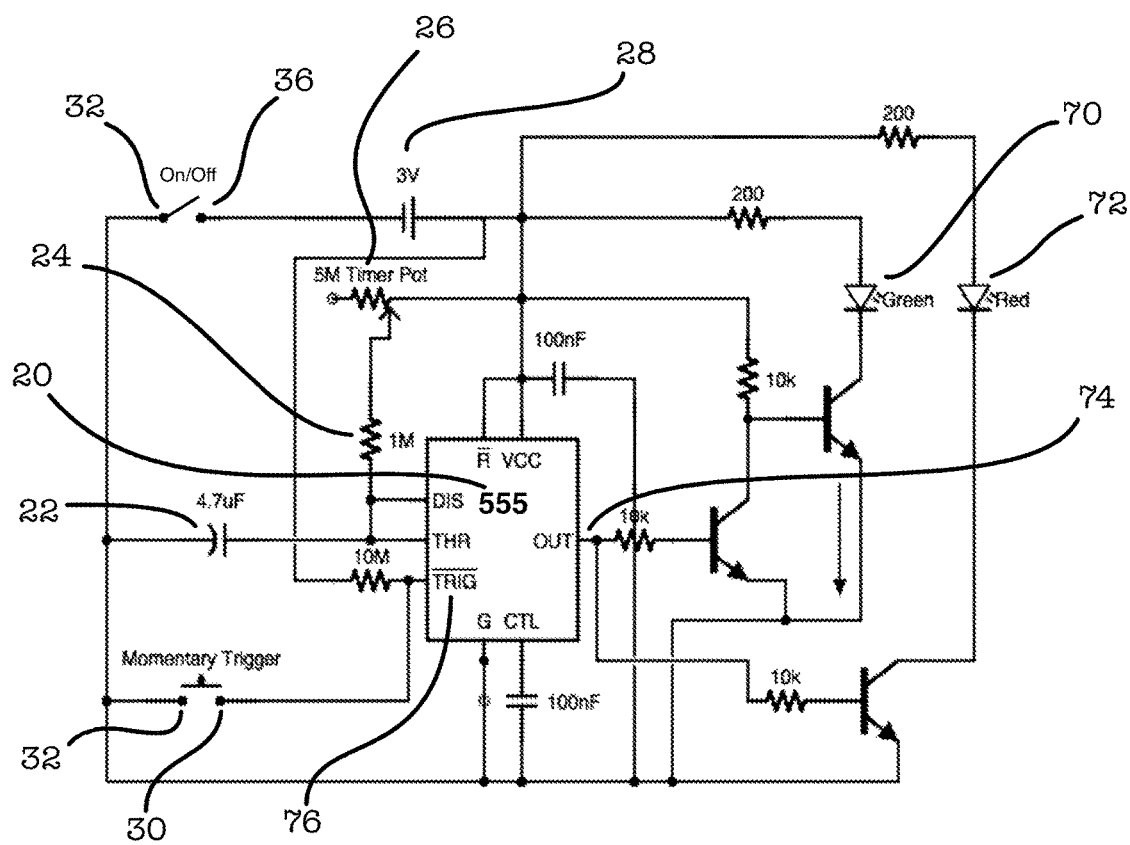
FIG. 5 illustrates a schematic diagram of one embodiment of the circuit which controls the timing and visual indicators.
Figure 6:
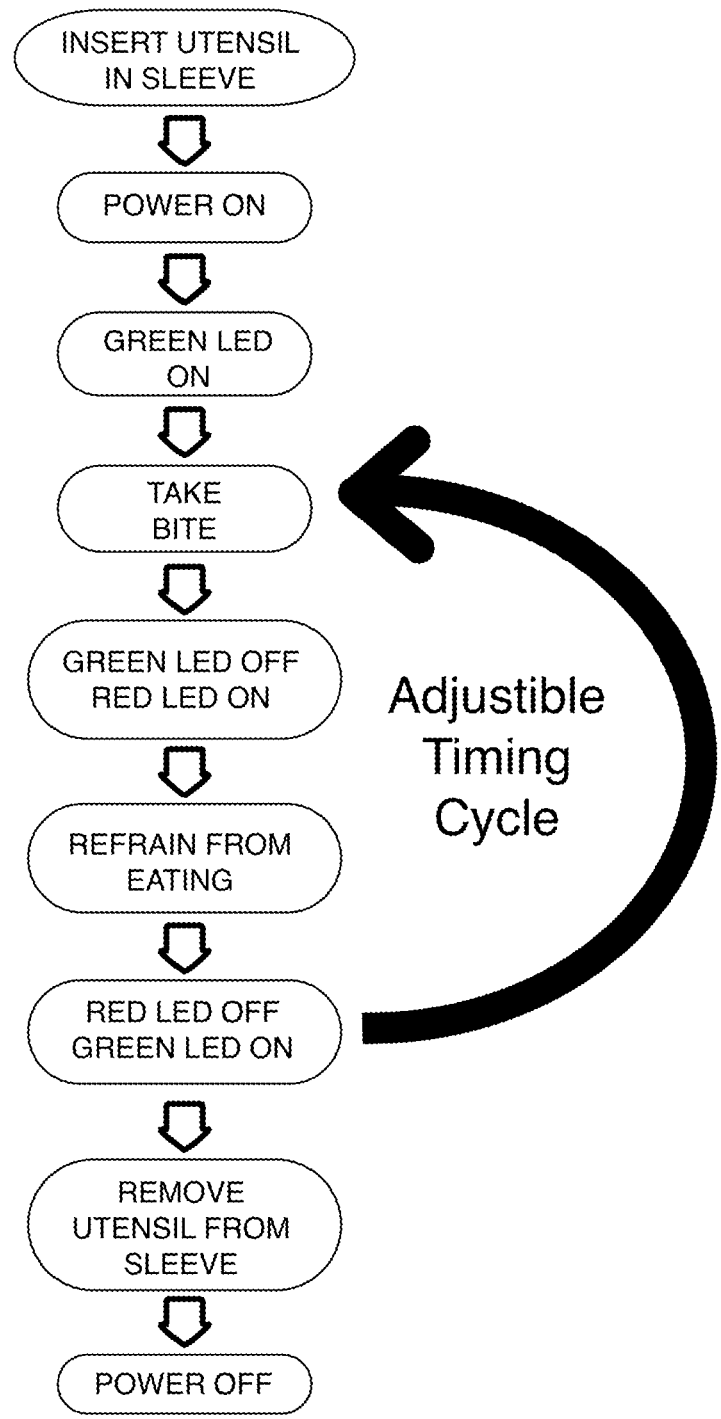
FIG. 6 contains a flowchart showing the complete cycle of one embodiment of the invention's use, from powering up the timing circuit by inserting a utensil, to cycling through each bite taken and the delay in eating encouraged by the red and green visual indicator LEDs, to the extraction of the utensil and powering down of the timing circuit.

Using FIGS. 4, 5 and 6, I will describe how the first embodiment operates, and then will describe the process in more detail.

The purpose of the first embodiment is to encourage dieters to slow down while eating, which for reasons mentioned above, aids in weight loss. The first embodiment is to be used during meal time. When the user is about to eat anything that requires a utensil (fork or spoon), they would slip the fork 14a or spoon 14b, hereinafter referred to as utensil, into the front slot 58 of the sleeve 10. The insertion of the utensil into the sleeve powers on the circuit. The green visual indicator LED 70 lights up, indicating to the user that they make take a bite. As they take a bite, their mouth's contact with the utensil (or food on the utensil) connects the timing cycle trigger connector 30 to circuit ground 32, triggering a timing cycle, which turns the green LED 70 off and turns the red LED 72 on. The red LED indicates that the user should refrain from eating. I contemplate the timing cycle running from approximately 5 seconds to 35 seconds, depending on the setting of variable resistor 26 (FIG. 2a), but other delay ranges can be used. During this time when the red LED is on, the user can set their utensil down, cut their food, gather more food onto the utensil or otherwise prepare for their next bite. Once the timing cycle completes, the red LED will turn off and the green LED will turn on, indicating that another bite may be taken. See FIG. 6 for the sequence of steps involved in the eating process. This process continues during the length of the meal, resulting in fewer bites of food taken during the meal, and a more substantial feeling of fullness since the brain has had time to receive notification from the stomach that it is full.

Once they are finished, the user would slip the dirtied eating utensil out of the sleeve, deactivating the circuit and turning off both LEDs. The utensil is washed as usual (or left at the table if dining out) and the clean sleeve can be stored in their pocket, purse or any other convenient place where it is ready for the next meal.

ALTERNATIVE EMBODIMENTS

A second embodiment of the present invention includes substantially all of the components of the first embodiment but where the circuit board 12 can be flexible, washable, and an integral part of the sleeve 10.

A third embodiment of the present invention includes substantially all of the components of the first embodiment but where the sleeve 10 can be of different sizes to accommodate unusually large or small utensil handles.

A fourth embodiment of the present invention includes substantially all of the components of the first embodiment but where the sleeve 10 can be made of a solid material.

A fifth embodiment of the present invention includes substantially all of the components of the first embodiment but where the electrically conductive material 38a, 38b, 40a, 40b, 40c, 42a, 42b can be replaced with thin wire or metal.

A sixth embodiment of the present invention includes substantially all of the components of the first embodiment but where the function of the timing circuit variable resistor 26 in the timing circuit can be accomplished by a sliding variable resistor, a bank of dip switches, or the insertion of one of a number of "buttons" or "sheets" of varying resistance, each one numbered according to a unique resistance or delay value.

A seventh embodiment of the present invention includes substantially all of the components of the first embodiment further including a power switch to energize the circuit, and a button placed on the sleeve that triggers the timing cycle, so that the sleeve may be used with plastic or other non-conductive utensils.

While the present invention has been described with respect to several different embodiments, it will be obvious that various modifications may be made that adhere to the spirit and scope of the present invention.

DETAILED DESCRIPTION—ADVANTAGES

Although others have invented timing devices designed to assist with portion control, one or more aspects of my invention are superior because:

It consists of a sleeve that can fit over any metal eating utensil, such as a fork or a spoon, allowing you to continue using your favorite dinnerware It is touch-activated, using the body's conductivity to trigger the timing sequence automatically when a bite is taken, and involves far less circuitry than human body capacitance or potential measurement It does not require a manually activated on/off switch, as it is activated when the utensil (fork or spoon) is inserted into the sleeve It is a simpler, less complex and thus less costly design It contains visual indicators that alert the user when they can take their next bite, and when they must wait.

It has an adjustable delay that allows the user to increase the pause between bites as the user learns to eat slower.

Because the sleeve is separate from the utensil, it remains clean and, once removed from the utensil, can be stored in a pocket or purse after eating.

CONCLUSION, RAMIFICATIONS AND SCOPE

The touch activated eating utensil sleeve as described in the present embodiments provides numerous advantages for the user trying to establish portion control by eating more slowly. Several advantages of one or more aspects are as follows: to fit into a pocket or purse, be removed, and slid onto a favorite fork or spoon, activating it automatically, that will sense a bite of food automatically, pause a user-adjustable period of time, that can be removed from the soiled utensil, that can be low cost and simple to use.

What is claimed is:

1. A dieting aid utensil sleeve for regulating food intake, comprising, a sleeve into which an ordinary eating utensil can be inserted and which can be held by the hand; an electronic timer circuit incorporated into said sleeve; said electronic timer circuit having a means of powering on when utensil is inserted; said timing electronic timer circuit having a means of sensing, through the touch of the mouth to utensil or food thereon, when a bite has been taken; an electronic timer circuit provides a means of visually indicating when the user should continue eating and said electronic timer circuit provides a means of visually indicating when the user should pause from eating.

2. The utensil sleeve of claim 1, wherein said electronic timer circuit provides a user-adjustable delay control.

3. The utensil sleeve of claim 1, wherein said sleeve is flexible to accommodate utensils of varying handle sizes.

* * * * *